United States Patent
Kresl et al.

(10) Patent No.: US 10,282,071 B2
(45) Date of Patent: May 7, 2019

(54) ASSET-DRIVEN DYNAMICALLY COMPOSED VISUALIZATION SYSTEM

(71) Applicant: Iconics, Inc., Foxborough, MA (US)

(72) Inventors: Vojtech Kresl, Plzen (CZ); Pavel Lederbuch, Chlumcany (CZ); Petr Balda, Plzen (CZ); Ivo Zeleny, Plzen (CZ); Jaroslav Bauml, Klatovy (CZ); Russell L. Agrusa, Westwood, MA (US)

(73) Assignee: Iconics, Inc., Foxborough, MA (US)

( * ) Notice: Subject to any disclaimer, the term of this patent is extended or adjusted under 35 U.S.C. 154(b) by 273 days.

(21) Appl. No.: 15/190,400

(22) Filed: Jun. 23, 2016

(65) Prior Publication Data
US 2016/0378306 A1    Dec. 29, 2016

Related U.S. Application Data

(60) Provisional application No. 62/185,335, filed on Jun. 26, 2015.

(51) Int. Cl.
G06F 3/048 (2013.01)
G06F 3/0484 (2013.01)
(Continued)

(52) U.S. Cl.
CPC ....... G06F 3/04842 (2013.01); G05B 19/042 (2013.01); G06F 3/0482 (2013.01);
(Continued)

(58) Field of Classification Search
None
See application file for complete search history.

(56) References Cited

U.S. PATENT DOCUMENTS

| 5,950,006 A | 9/1999 | Crater et al. |
| 5,975,737 A | 11/1999 | Crater et al. |

(Continued)

FOREIGN PATENT DOCUMENTS

| EP | 2728427 A1 | 5/2014 |
| WO | WO-2002/033802 A1 | 4/2002 |
| WO | WO-2002/063505 A1 | 8/2002 |

OTHER PUBLICATIONS

International Search Report and Written Opinion for International Application No. PCT/US2016/039249 dated Oct. 20, 2016. (14 pages).

(Continued)

*Primary Examiner* — William C Trapanese
(74) *Attorney, Agent, or Firm* — Goodwin Procter LLP

(57) ABSTRACT

An application having a graphical user interface is provided for constructing a visualization of an automation system that includes a plurality of objects. The application forms a visualization control that is, in essence, a building block of the visualization of the automation system. The visualization control is associated with an object that includes a reference to a visualization template and properties associated with the object. The object is retrieved from an object storage and, similarly, the visualization template is retrieved form a template storage. The application generates a visualization of the object by mapping its properties to the template. The generated visualization is then assigned to the visualization control.

16 Claims, 5 Drawing Sheets

(51) Int. Cl.
  *G06F 8/38* (2018.01)
  *G05B 19/042* (2006.01)
  *G06F 3/0482* (2013.01)
  *G06F 8/36* (2018.01)

(52) U.S. Cl.
  CPC ...... *G06F 8/38* (2013.01); *G05B 2219/23258* (2013.01); *G05B 2219/25011* (2013.01); *G06F 8/36* (2013.01)

(56) References Cited

U.S. PATENT DOCUMENTS

| | | |
|---|---|---|
| 6,201,996 B1 | 3/2001 | Crater et al. |
| 6,965,855 B1 | 11/2005 | Burbridge et al. |
| 7,003,558 B2 | 2/2006 | Agrusa et al. |
| 7,162,534 B2 | 1/2007 | Schleiss et al. |
| 7,567,844 B2 | 7/2009 | Thomas et al. |
| 8,219,669 B2 | 7/2012 | Agrusa et al. |
| 8,321,806 B2 | 11/2012 | Agrusa et al. |
| 2002/0138582 A1 | 9/2002 | Chandra et al. |
| 2005/0257204 A1 | 11/2005 | Bryant et al. |
| 2007/0038963 A1 | 2/2007 | Moore |
| 2007/0052702 A1 | 3/2007 | Trotta et al. |
| 2007/0132779 A1* | 6/2007 | Gilbert ............ G06F 9/4488 345/619 |
| 2007/0148658 A1 | 6/2007 | Nelson et al. |
| 2009/0112664 A1 | 4/2009 | Sprogis et al. |
| 2009/0210071 A1 | 8/2009 | Agrusa et al. |
| 2009/0210814 A1 | 8/2009 | Agrusa et al. |
| 2014/0129002 A1* | 5/2014 | Brandes ............ G05B 19/0426 700/83 |

OTHER PUBLICATIONS

Brecher et al., (2012) "Plug and Play Device Integration for Industrial Automation with Instant Machine Visualization Using RFID Technology," vol. 6, No. 2. (8 pages).

De Luca et al., (2013) "The Use of NFC and Android Technologies to Enable a KNX-based Smart Home," 21st International Conference on Software, Telecommunications and Computer Networks. (7 pages).

International Search Report and Written Opinion for International Application No. PCT/US08/78434 dated Jan. 12, 2009 (8 pages).

* cited by examiner

ASSET-DRIVEN DYNAMICALLY COMPOSED VISUALIZATION SYSTEM

CROSS-REFERENCE TO RELATED APPLICATION

This application claims priority to and the benefit of U.S. Provisional Patent Application No. 62/185,335, filed on Jun. 26, 2015, and entitled "Asset-Driven Dynamically Composed Visualization System," the entirety of which is incorporated by reference herein.

FIELD OF THE INVENTION

The present disclosure relates generally to user interfaces and, more particularly, to systems and methods for dynamically created and configurable visualization interfaces for automation systems.

BACKGROUND

Process monitoring and control relates to the viewing and control of parameters of one or more processes, environments in which the processes are performed, and/or the operation of equipment executing the processes. In the manufacturing context, for example, process parameters can include duration, temperature, pressure, speed, quantity, and/or direction of motion of a particular piece of machinery. In other processes, such as in those performed in the course of using and maintaining information systems, management systems, and the like, the parameters can include to temperature of the operating environment, throughput (transactional and/or packet-based), downtime, usage, and similar quantities.

Automation, or process control, systems can be used to help manage production, monitor and maintain equipment, view performance and operational trends, and/or perform business functions such as remotely modifying operational parameters, visual inspections, and maintenance scheduling. However, user interfaces in modern automation systems are exceedingly complex, and the configuration of such interfaces is generally a substantially time consuming and error-prone process. Accordingly, personnel who create, set up, and use such automation systems would benefit from enhanced techniques for generating and configuring visualization interfaces to reduce the required engineering work and increase the accuracy and efficiency of these processes.

SUMMARY

Described herein is a new dynamically configurable and re-configurable visualization system usable with, for example, automation and operational process control systems. A dynamic asset-driven visualization provides numerous possibilities for automatic composition of visualization displays at run-time, on-the-fly, based on the user request. Fast re-configuration of a production plant or other system allows an agile reorganization of assets, reduces the cost of reorganization, and better utilizes the resources of the system Accordingly, in one aspect, a computer-implemented method for creating an automation system visualization is disclosed. An application that includes a graphical user interface for constructing a visualization of an automation system is provided. The automation system includes a plurality of objects that can be organized, for example, in a hierarchy. The application forms a visualization control that is a building block of the visualization of the automation system. The visualization control is associated with a first object in the plurality of objects. The first object, which includes (i) a reference to a first visualization template and (ii) a plurality of properties associated with the first object, is received from an object storage. The referenced first visualization template is received from a template storage. The application then generates a visualization of the first object by mapping the properties associated with the first object to the visualization template, and assigns the visualization of the first object to the visualization control.

The first visualization template can be a generic form of a type (e.g., location, sensor, control, etc.) of the first object, and can include a plurality of parameters to which one or more of the properties of the first object are mapped. The visualization control itself can include metadata defining its visual properties. An automation control data source can also be assigned to the visualization control.

In one implementation, at least steps (c) through (e) are repeated for each child object in the first object. The application can form additional respective visualization controls for each child object in the first object, and place the additional visualization controls in the parent visualization control based on the first visualization template. In one instance, the first object defines a location, and the child objects define automation system assets at the location.

Ultimately, the visualization of the automation system can be made up of a plurality of visualization controls generated based on respective objects and templates.

Other aspects and implementations of the above include corresponding systems and non-transitory computer-readable media. Further aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Described in various implementations herein are systems and methods for providing a visualization (e.g., a graphical representation and/or user interface) of an automation (process control) system, such as a manufacturing, industrial, energy, water treatment, or building (e.g., heating, air conditioning and ventilation) automation system, by dynamically generating and configuring the visualization from a system description stored in an asset (e.g., a software-based object) in combination with configuration template objects.

Figure 1:
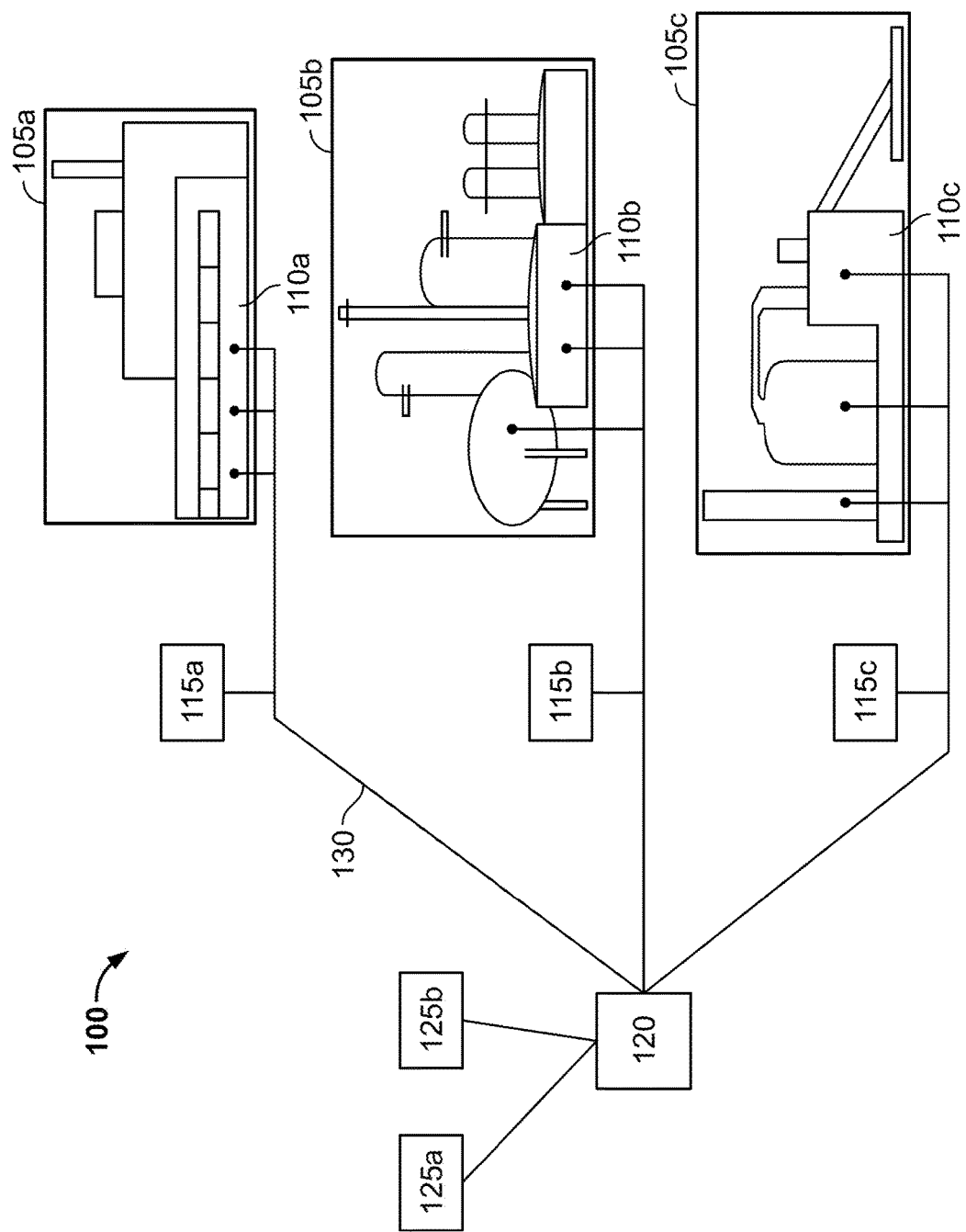
FIG. 1 depicts a general environment in which various implementations of the disclosed techniques can operate.

FIG. 1 depicts an exemplary automation system environment 100 for which an control interface can be generated and configured using various implementations of the present techniques. The environment 100 includes operational components that collect, analyze, present, and act on operational process control (OPC) data as it is generated and collected. The OPC data is generated and collected at or more facilities 105a, 105b and 105c (generally, 105). In this example, three facilities 105 are shown for illustrative purposes only, as there can be any number of facilities 105, which can be part of a common processing or manufacturing facility, or geographically dispersed around the globe performing vastly different operations.

To monitor individual processes and controls at each facility 105, process control equipment 110a, 110b and 110c can be installed to measure one or more processing parameters associated with the processes. For example, a gauge can be placed inside a boiler to measure the temperature and/or pressure, or an optical scanner can be placed at the end of a manufacturing step to measure throughput or look for defects, and so on. In any case, the data from the individual pieces of process control equipment 110 can be collected for the entire facility and reported at a facility-specific OPC server 115a, 115b, and 115c for reporting and control purposes. The data collection and reporting may take place in real-time, asynchronously, or, in some cases, a combination of both.

In some implementations, a centralized data collection and reporting system can consolidate, aggregate and/or compare data collected from each facility 105 and the various processes 110 operating at each facility 105. In such cases, an enterprise OPC server 120 can communicate with the facility-specific OPC servers 115, the individual controllers 110 continuously or periodically using one or more data communications services. The enterprise OPC server 120 can in turn support client workstations 125a and 125b at which users can generate and configure user interfaces for viewing representations of the OPC data and, in some cases, for sending commands to manipulate processes and controls at each facility 105.

Some or all of the components described above can be connected by and communicate via a network 130. The communication can take place via any media such as standard telephone lines, LAN or WAN links (e.g., T1, T3, 56 kb, X.25), broadband connections (ISDN, Frame Relay, ATM), wireless links, and so on. The network 130 can carry TCP/IP protocol communications, and HTTP/HTTPS requests made by a web browser and the connections among the controllers 110, the facility-specific OPC servers 115, the enterprise OPC server 120 and the client workstations 125 can be communicated over such TCP/IP networks. The type of network is not a limitation, however, and any suitable network can be used. Typical examples of networks that can serve as the communications network 130 include a wireless or wired Ethernet-based intranet, a local or wide-area network (LAN or WAN), and/or the internet, which can accommodate many different communications media and protocols.

Figure 2:
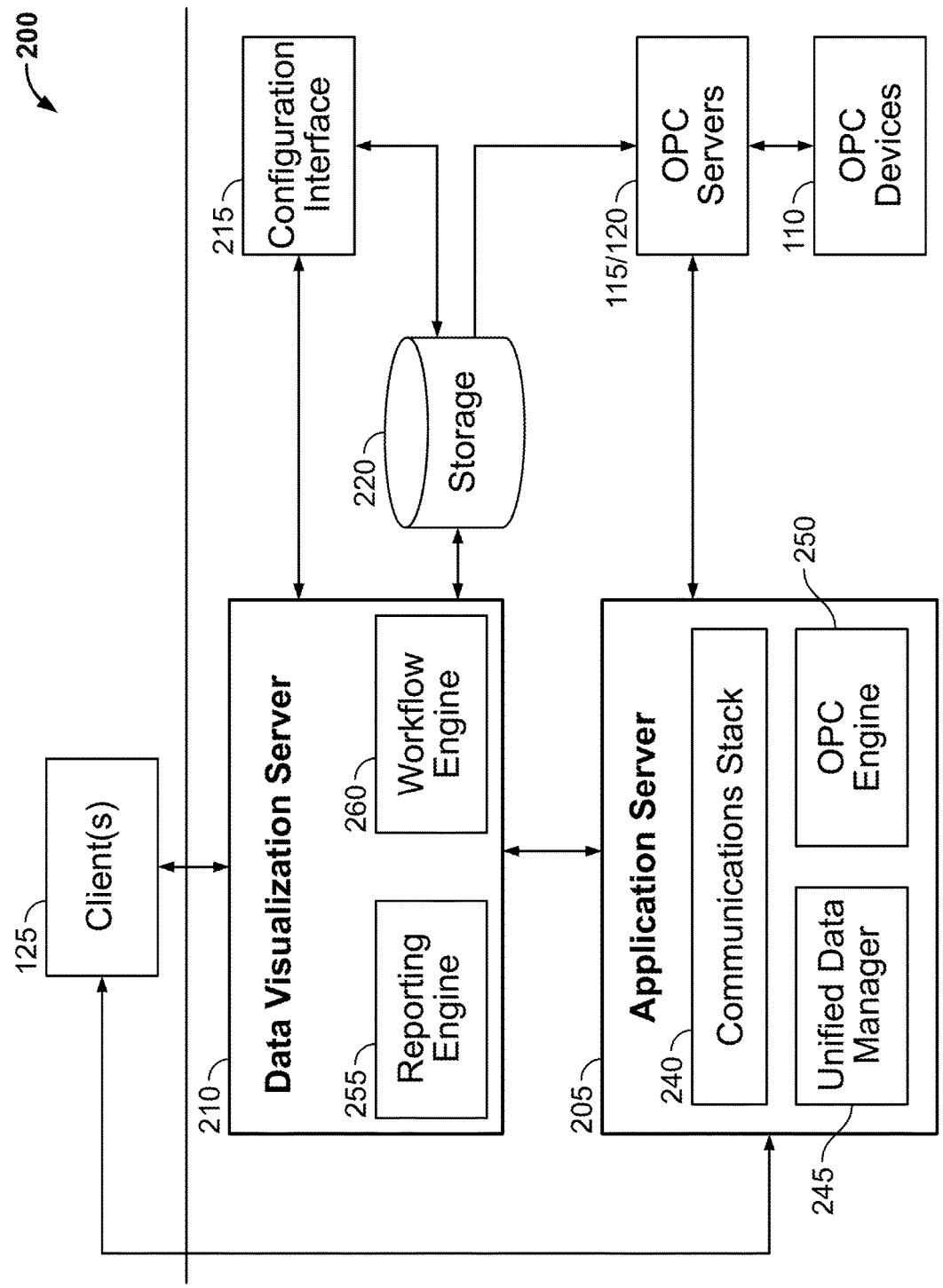
FIG. 2 depicts an example application framework according to an implementation.

FIG. 2 illustrates an exemplary system 200 for collecting and reporting OPC data, including an application server 205, a data visualization server 210, and a configuration user interface 215 that each can operate in concert with one or more OPC servers. The system 200 can also include one or more data storage devices 220 for storing, among other things, configuration parameters that define the OPC servers, software-based objects and other data structures that define individual components in an automation system and their associated properties, and templates that are used in the configuration of automation system visualizations. Data storage device(s) 220 can include a non-transitory computer-readable storage medium, such as a hard disk drive, solid-state drive, random access memory, etc., and can store data in the form of a database, individual files, and so on.

The application server 205 provides data collection, aggregation and transformation processing for the system. For example, the application server 205 includes a communication stack 240 that allows the application server 205 to request and/or receive data from individual OPC servers 115, send data to the data visualization server 210 for charting and reporting, and the client workstations 125. The communications stack 240 includes a series of layered protocols for packaging and transmitting data among computers over a network. In some implementations, the communications stack provides TCP/IP-based communications among the system components to allow data to be sent via HTTP requests, XML/Web Services, and similar methods.

The application server 205 also includes a unified data manager component 245 for manipulating data received from the various OPC servers 115. In many implementations, data is collected from processes and facilities with little or no defined relationship among the data elements. For example, a shift supervisor can enter comments into an electronic log, and the comments receive timestamps and an operator ID. At the same time, OPC devices can collect processing data such as throughput (e.g., pieces/hour) and quality measurements (e.g., defects/100 pieces), all of which are measured using different units (if any) and relating to different aspects of the facility. The unified data manager component 245 analyzes the incoming data and applies a rules-based algorithm to allow the data to be reported and charted using common units.

In some implementations, the application server 205 also includes an OPC engine 250 for analyzing the OPC data as it is collected (either in real-time or asynchronously) and determining what subsequent processing, events and/or alarms are appropriate. For example, a set of rules can be defined such that the certain events (e.g., non-receipt of data, a data value outside a preferred range, etc.) warrant an alarm to be triggered and sent to a client workstation 125. In some instances the OPC engine 250 formats the data for presentation on reports and charts.

The data visualization server 210 receives data from the application server 205 and presents it at the visualization server 210 and/or at one or more clients 125. The data can be presented in various forms, such as raw tabular form, text-based reports, graphical reports, and real-time graphical representations of the monitored processes enhanced with additional data (e.g., supply-chain data, inventory data, financial data, etc.), alarms, and visual indicators relating to the processes. A reporting engine 255 utilizes pre-defined report formats and includes graphical tool-kits that facilitate the design of custom graphs based on user and/or process-specific requirements. In some implementations, OPC data is annotated with workflow information, such as a distribution list identifying recipients (e.g., individuals, workstations, or other systems) to which the data is to be sent. In some instances, the OPC data is available in raw format according to one or more OPC standards using commonly-used data publishing techniques such as web services. In other cases, reports and/or data can be sent in-preformatted reports or as a stream of data used by a client application. In such cases, a workflow engine 260 manages the distribution of data and/or reports according to workflow rules associated therewith.

Configuration interface application 215 allows users to generate and configure, in an at least partially automated manner, a visualization of an automated system for presentation via visualization server 210, as further described below.

The techniques described herein can be implemented in appropriate hardware or software. The system 200 can include, for example, clients and servers capable of running one or more commercial operating systems such as the Microsoft Windows® operating systems, the Apple OS X® operating systems, the Linux® operating system and other variants of UNIX® operating systems, and the like. Clients can include, for example, a workstation, a smart or dumb terminal, network computer, smartphone, tablet, laptop, palmtop, wireless telephone, television, information appliance, wireless device, minicomputer, mainframe computer, or other computing device, that is operated as a general purpose computer or a special purpose hardware device that can execute the functionality described herein. Generally, software executing on devices in the system 200 can be implemented on a computer including a processing unit, a system memory, and a system bus that couples various system components including the system memory to the processing unit.

The software architecture of the visualization system components can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework. The visualization system and associated components can be implemented as native applications, web applications, or other form of software. In some implementations, a particular application is in the form of a web page, widget, and/or Java, JavaScript, .Net, Silverlight, Flash, and/or other applet or plug-in that is downloaded to a user device and runs in conjunction with a web browser. An application and a web browser can be part of a single client-server interface; for example, an application can be implemented as a plugin to the web browser or to another framework or operating system. Any other suitable client software architecture, including but not limited to widget frameworks and applet technology can also be employed.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Figure 3:
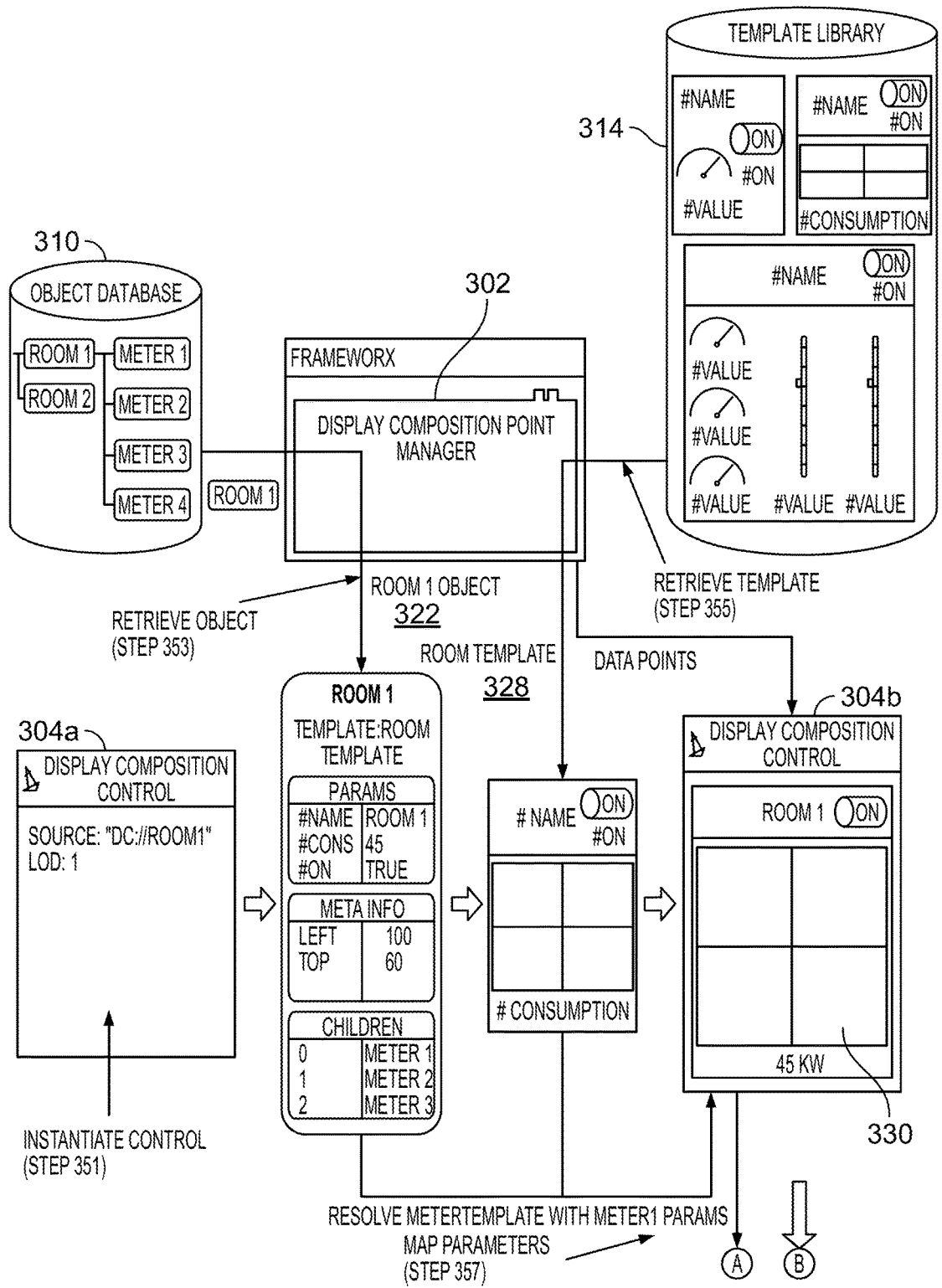
FIG. 3 depicts an example method for generating a visualization according to an implementation.
Figure 3:
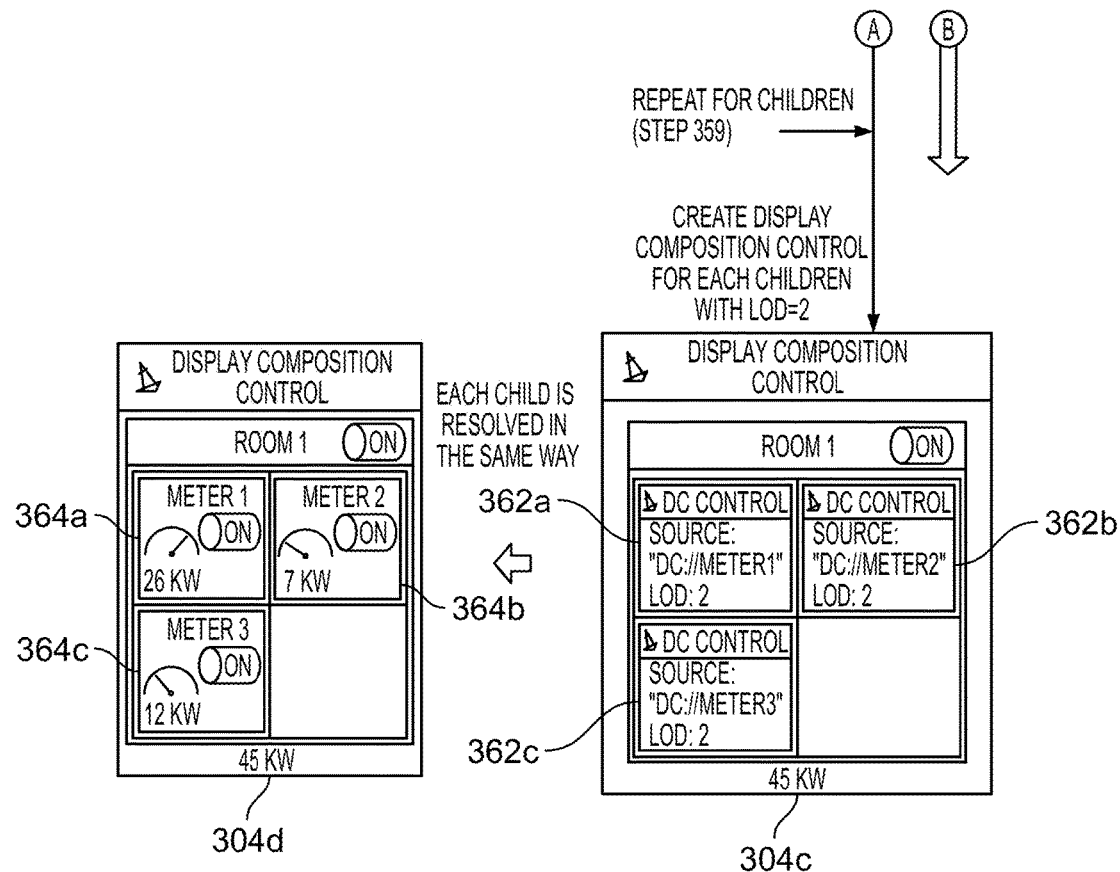

FIG. 3 depicts one implementation of a process for constructing a visualization of an automation system using a graphical user interface provided by a software application, e.g., configuration interface application 215, which can be a web-based or native application, for example. The application can include Display Composition (DC) Point Manager 302, which interfaces with data storage (e.g., data storage device 220) to retrieve data objects, values, templates, and other information used in generating the visualization.

In STEP 351, a visualization control (here, Display Composition (DC) Control 304a) is formed or otherwise instantiated by the application. The visualization control represents, in essence, a building block of the visualization, and is associated with an object in the automation system. The visualization control can include a reference (e.g., a link) to one or more objects in an object storage, such as object database 310, and, during instantiation of the control, the referenced object(s) can be retrieved from the object database 310 via DC Point Manager 302 interfacing with the object database 310 (STEP 353). As shown in FIG. 3, Display Composition Control 304a includes a reference (Source: "dc://Room1") to object "Room 1" in the object database 310.

Object database 310 can store an overall description of an automated system, i.e., its parts (assets), their relationships and hierarchy, visual representations of the system parts, and other information. In one implementation, objects are software-based representations of a physical or conceptual component, grouping, location, or any other portion of an automation system. The types of objects are virtually limitless and can include, for example, a room, a door, a building, a site, a valve, a gauge, a temperature sensor, a pressure sensor, a meter, a computer, an identification card reader, or a security camera. Objects can have various properties or parameters, such as the name of the object, the geographical coordinates of the object, whether the object is active, what child objects are associated with the object, and metadata defining visual properties of the object (e.g., screen location, size, color, associated graphics, etc.). An object can also include a reference to a visualization template, as further described below.

In some implementations, objects are structured in one or more hierarchies within object database 310. For example, a monitored automation system can have as the root of the hierarchy the monitored site, with children being individual buildings, and children of the buildings being individual rooms. Each room can then have children associated with monitored processes within, such as heating, cooling, assembly line, and so on, and the children of each of the foregoing include individual monitored components, such as thermostat, speed control, oil pressure sensor, etc. In the depicted example in FIG. 3, the hierarchy in object database 310 includes a "Room 1" object with child objects "Meter 1" through "Meter 4."

In STEP 355, the visualization template 328 referenced by the retrieved object 322 is retrieved from template library storage 314 via DC Point Manager 302 interfacing with the template library storage 314. Here, in FIG. 3, the template 328 retrieved is the "RoomTemplate" associated with the "Room1" object 322. In one implementation, a visualization template is a generic form for a particular type of object (e.g., location, automation component such as a sensor or control, or other asset, as well as subcategories of the foregoing, such as assembly floor area, temperature sensor, and pressure release valve) that defines how the object can be visually structured and configured. The template can include parameters to which properties of an object can be mapped, saving the user from having to configure every object manually.

Accordingly, in STEP 357, the visualization template 328 is resolved by the object 322 (i.e., the properties of the object 322 are mapped to the parameters of the template 328, where applicable), forming a visualization 330 of the object 322. For example, a template 328 for a "Room 1" object 322, as shown in FIG. 3, can define a grid into which child objects are visually arranged, with a "#Name" parameter that the name of the "Room1" object 322 can be mapped to and, therefore, be shown on that visualization control. Similarly, the "#On" property of the "Room1" object 322 can be mapped to the "#On" switch in the template 328. Here, the template 328 also includes a "#Consumption" parameter, which represents a real-time display of energy usage cumulatively measured by the child objects (meters) in the room. In other words, "#Consumption" is defined as childObject1.consumption+childObject2.consumption+ . . . + childObjectN.consumption Ultimately, the generated visualization 330 is assigned to and placed into the DC Control (shown as DC Control 304b in FIG. 3). DC Control 304b can have associated metadata to define its visual properties (e.g., width, height, stretch, etc.) within the visualization interface. Multiple visualization controls can be combined and assembled together to form a comprehensive visualization interface of an automated system.

In some implementations, objects received from the object database 310 include one or more child objects (and such child objects can have their own child objects, and so on). For each child object, a process similar to the above described process can be performed. In particular, a DC Control for the child can be instantiated (corresponding to STEP 351), the child object and template referenced by the child object can be retrieved from object database 310 and template library storage 314, respectively (corresponding to STEPS 353 and 355), and the child object and template can be resolved (corresponding to STEP 357), thereby generating a visualization of the child object. The visualization of the child object can then be assigned to and placed in the DC Control instantiated for the child object. Further, in some instances, the child DC control is also assigned to and placed in the DC control of its parent. For example, as shown in FIG. 3, each of the three child objects (Meter 1, Meter 2, and Meter 3) has instantiated a respective DC Control 362a-c, which are placed in the grid defined by the parent DC Control (now shown as DC Control 304c). In resolving the child objects and templates, meter visualizations 364a-c are generated and are displayed in the parent DC Control (now shown as DC Control 304d).

In some implementations, an object can define, via properties, one or more automation control data sources (e.g., sensor data, status information, video feeds, etc.) to be associated with the object. In some instances, a user can manually associate a data source with the object. The data sources can provide real-time data so that a user can view information associated with the automation system (and, in some implementations, control the automation system) via the generated visualization in real-time.

Figure 4:
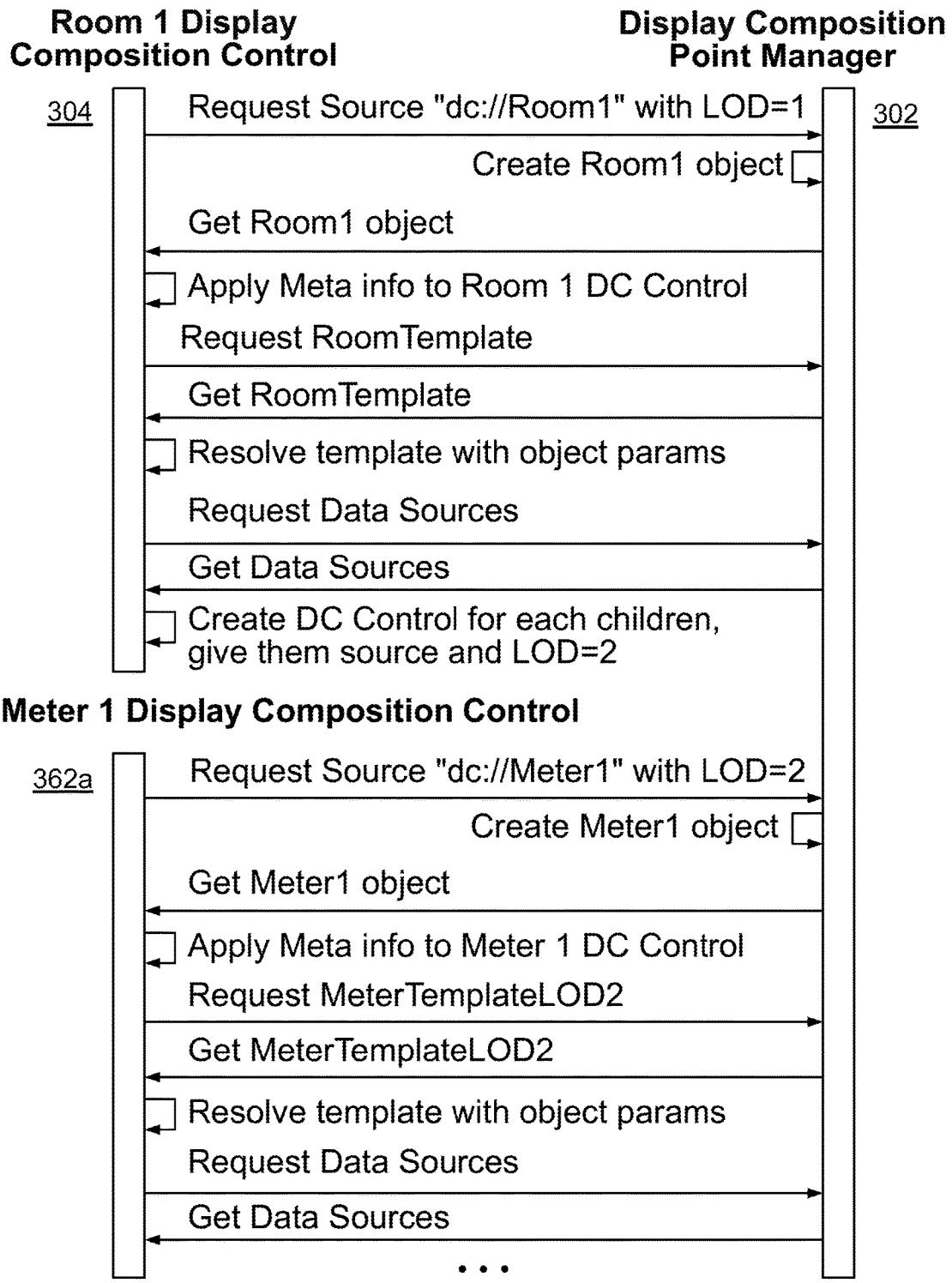
FIG. 4 depicts an example information flow in generating a visualization according to an implementation.

FIG. 4 depicts example communication between DC Point Manager 302 and DC Control (i.e., DC Control 304a-d, collectively, DC Control 304), and then Meter 1 DC Control 362a, at various stages in the process illustrated by FIG. 3. Upon instantiating DC Control 304 at STEP 351, a request for the object referenced by DC Control 304 (i.e., "Room1") is made to DC Point Manager 302. A level of depth (LOD) parameter can be included with the request, which specifies how deep in the hierarchy a particular object is and, in some instances, how it can be represented in the resulting visualization. So, for example, Room1 has an LOD of 1, as it is a top level object, whereas the child objects of Room1 will have LODs of 2 or higher. In response, DC Point Manager 302 creates the object 322 (e.g., instantiates a software object or data structure including properties of the object stored in object storage 310) and returns the object 322 to DC Control 304 (STEP 353). Metadata associated with the object 322 can be applied to the DC Control 304 to set the visual properties of the DC Control 304 as appropriate for the object 322. DC Control 304 then makes a request for the visualization template 328 referenced by the object 322. In response, DC Point Manager 302 returns the template 328 to the DC Control 304 (STEP 355), which proceeds to perform the above-described resolving process between the object properties and template parameters (STEP 357).

In some implementations, DC Control 304 further requests data sources defined by the object 322 from DC Point Manager 302. Such data sources can include real-time or non-real-time data feeds associated with the object 322, such as sensor readings or other process control data. These data sources can be associated with the visualization control (DC Control 304) to provide users with various forms of process control data via the overall visualization.

Similar communication occurs for child objects, if any, of the (parent) object 322 (corresponds to STEP 359 of FIG. 3). Initially, a DC Control 362a-362c is created for each child object. Then, each child object communicates with DC Point Manager 302, serially or in parallel, to automatically configure itself. For example, as shown in FIG. 4, DC Control 362a requests its corresponding object (i.e., "Meter1") from DC Point Manager 302, which creates and returns the requested child object. Metadata defining visual properties associated with the Meter1 child object can then be applied to the Meter1 DC Control 362a. Further, the visualization template referenced by the Meter1 object is requested from DC Point Manager 302, which returns the generic Meter template in response. DC Control 362a maps the Meter1 object properties to the Meter template parameters, resulting in a visualization 364a of Meter1. Again, a data source can be requested from DC Point Manager 302 and, when received, can be associated with the Meter1 DC Control 362a. In this case, sensor readings associated with the actual corresponding meter in the automation system can be associated with the Meter1 DC Control 362a and visually represented to the user via, e.g., a graphical depiction of a meter.

To the extent that additional children (or children of children, and so on) exist, the process can continue in the same manner to generate and configure each corresponding DC Control, ultimately resulting in an easily generated and automatically configured visualization of an automated system.

While various implementations of the present invention have been described herein, it should be understood that they have been presented by example only. Where methods and steps described above indicate certain events occurring in certain order, those of ordinary skill in the art having the benefit of this disclosure would recognize that the ordering of certain steps can be modified and that such modifications are in accordance with the given variations. For example, although various implementations have been described as having particular features and/or combinations of components, other implementations are possible having any combination or sub-combination of any features and/or components from any of the implementations described herein.

The invention claimed is:

1. A computer-implemented method comprising:
    (a) providing an application comprising a graphical user interface for constructing a visualization of an automation system, the automation system comprising a plurality of objects;
    (b) forming, by the application, a first visualization control comprising a building block of the visualization of the automation system, wherein the first visualization control is associated with a first object in the plurality of objects;
    (c) receiving the first object from an object storage, the first object comprising (i) a reference to a first visualization template, (ii) a plurality of properties associated with the first object, and (iii) a plurality of children of the first object, wherein the first visualization template comprises a generic form of the first object defining how the first object can be visually structured and configured;
    (d) receiving the first visualization template referenced by the first object from a template storage;
    (e) generating, by the application, a visualization of the first object by mapping the properties associated with the first object to the first visualization template;
    (f) assigning, by the application, the visualization of the first object to the first visualization control;
    (g) forming, by the application, a respective visualization control for each child of the first object, wherein each child of the first object automatically configures itself by:
        requesting, by the visualization control for the child, a child object corresponding to the child from the object storage;
        receiving the child object from the object storage, the child object comprising (i) a reference to a second visualization template and (ii) a plurality of properties associated with the child object; and
        generating, by the application, a visualization of the child object by mapping the properties associated with the child object to the second visualization template; and
    (h) placing the visualization control for each child of the first object in the first visualization control based on the first visualization template.

2. The method of claim 1, wherein the plurality of objects forms a hierarchy of the objects.

3. The method of claim 1, wherein the first visualization template comprises a plurality of parameters to which one or more of the properties of the first object are mapped.

4. The method of claim 3, wherein a particular type of a particular object comprises a location, a sensor, or a control.

5. The method of claim 1, wherein the first visualization control comprises metadata defining visual properties of the first visualization control.

6. The method of claim 1, further comprising assigning an automation control data source to the first visualization control.

7. The method of claim 1, wherein the first object comprises a location and the child objects comprise automation system assets at the location.

8. The method of claim 1, wherein the visualization of the automation system comprises a plurality of visualization controls generated based on respective objects and templates.

9. A system comprising:
    at least one memory for storing computer-executable instructions;
    at least one processing unit for executing the instructions, wherein execution of the instructions programs the at least one processing unit to perform operations comprising:
        (a) providing an application comprising a graphical user interface for constructing a visualization of an automation system, the automation system comprising a plurality of objects;
        (b) forming, by the application, a first visualization control comprising a building block of the visualization of the automation system, wherein the first visualization control is associated with a first object in the plurality of objects;
        (c) receiving the first object from an object storage, the first object comprising (i) a reference to a first visualization template, (ii) a plurality of properties associated with the first object, and (iii) a plurality of children of the first object, wherein the first visualization template comprises a generic form of the first object defining how the first object can be visually structured and configured;
        (d) receiving the first visualization template referenced by the first object from a template storage;
        (e) generating, by the application, a visualization of the first object by mapping the properties associated with the first object to the first visualization template;
        (f) assigning, by the application, the visualization of the first object to the first visualization control;
        (g) forming, by the application, a respective visualization control for each child of the first object, wherein each child of the first object automatically configures itself by:
            requesting, by the visualization control for the child, a child object corresponding to the child from the object storage;
            receiving the child object from the object storage, the child object comprising (i) a reference to a second visualization template and (ii) a plurality of properties associated with the child object; and generating, by the application, a visualization of the child object by mapping the properties associated with the child object to the second visualization template; and (h) placing the visualization control for each child of the first object in the first visualization control based on the first visualization template.

10. The system of claim 9, wherein the plurality of objects forms a hierarchy of the objects.

11. The system of claim 9, wherein the first visualization template comprises a plurality of parameters to which one or more of the properties of the first object are mapped.

12. The system of claim 11, wherein a particular type of a particular object comprises a location, a sensor, or a control.

13. The system of claim 9, wherein the first visualization control comprises metadata defining visual properties of the first visualization control.

14. The system of claim 9, wherein the operations further comprise assigning an automation control data source to the first visualization control.

15. The system of claim 9, wherein the first object comprises a location and the child objects comprise automation system assets at the location.

16. The system of claim 9, wherein the visualization of the automation system comprises a plurality of visualization controls generated based on respective objects and templates.

* * * * *